(12) United States Patent
Dollhopf et al.

(10) Patent No.: US 9,394,685 B2
(45) Date of Patent: Jul. 19, 2016

(54) NOISE ABATEMENT FOR AIRCRAFT COMPONENTS AND SYSTEMS IN AIRCRAFT BAYS

(71) Applicant: HAMILTON SUNSTRAND CORPORATION, Charlotte, NC (US)

(72) Inventors: David J. Dollhopf, Rockford, IL (US); Alan Kasner, Long Grove, IL (US); Suzanne L. B. Woll, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 14/462,226

(22) Filed: Aug. 18, 2014

(65) Prior Publication Data

US 2016/0047119 A1   Feb. 18, 2016

(51) Int. Cl.
  *E04B 1/86* (2006.01)
  *E04B 1/84* (2006.01)
  *B64F 1/26* (2006.01)
  *G10K 11/168* (2006.01)

(52) U.S. Cl.
  CPC ... *E04B 1/84* (2013.01); *B64F 1/26* (2013.01); *G10K 11/168* (2013.01)

(58) Field of Classification Search
  CPC .......................................................... E04B 1/86
  USPC .................................. 181/284, 286, 292, 290
  See application file for complete search history.

(56) References Cited

U.S. PATENT DOCUMENTS 3,756,345 A * 9/1973 D'Amico et al. ............. 181/286
4,241,806 A * 12/1980 Metzger ....................... 181/284
4,384,634 A * 5/1983 Shuttleworth et al. ....... 181/213

* cited by examiner

*Primary Examiner* — Forrest M Phillips
(74) *Attorney, Agent, or Firm* — Snell & Wilmer L.L.P.

(57) ABSTRACT

An acoustic absorption material may comprise an outer layer and a first layer of batting material proximate to the outer layer. A first layer of room temperature vulcanized silicone (RTV) may be proximate to the batting material. A second layer of batting material may be proximate to the first layer of RTV opposite the first layer of batting material.

14 Claims, 5 Drawing Sheets

NOISE ABATEMENT FOR AIRCRAFT COMPONENTS AND SYSTEMS IN AIRCRAFT BAYS

FIELD OF INVENTION

The present disclosure relates to noise abatement in aircrafts, and, more specifically, to noise-damping material and an acoustic blanket for use in an aircraft.

BACKGROUND OF THE INVENTION

Aircraft parts (e.g., pumps and motors) may radiate energy in the form of noise during operation. Noise levels emanating from loud parts may cause passenger or bystander discomfort. However, standard insulating materials may not withstand some of the chemical and thermal conditions present in various aircraft compartments containing the loud aircraft parts.

SUMMARY OF THE INVENTION

An acoustic absorption material may comprise an outer layer and a first layer of batting material proximate to the outer layer. A first layer of room temperature vulcanized silicone (RTV) may be proximate to the batting material. A second layer of batting material may be proximate to the first layer of RTV and opposite the first layer of batting material.

In various embodiments, a second layer of RTV may be proximate to the second layer of batting material and opposite the first layer of RTV. A third layer of batting material may be proximate to the second layer of RTV and opposite the second layer of batting material. A fibrous glass layer may be proximate the RTV layer and opposite the first layer of batting material. A silicone layer may be proximate to the fibrous glass layer and opposite the RTV layer. The first batting material may comprise an aramid fiber. The outer layer may comprise a silicone-coated glass cloth. The batting material may be coated in RTV.

An acoustic blanket may comprise, a pad including an outer layer and a first layer of batting material proximate to the outer layer. A first layer of silicone may be proximate to the first layer of batting material. A strap may be around the pad configured to attach the blanket.

In various embodiments, the pad further comprises a second layer of batting material proximate to the first layer of silicone and opposite the first layer of batting material. A second layer of silicone may be proximate to the second layer of batting material and opposite the first layer of silicone. A third layer of batting material may be proximate to the second layer of silicone and opposite the second layer of batting material. The silicone may comprise a room temperature vulcanized silicone rubber (RTV). The strap may comprise a hook and loop fastener. The first batting material may comprise an aramid fiber. The outer layer may comprise a silicone-coated glass cloth. The batting material may be coated in RTV.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Different cross-hatching is used throughout the figures to denote different parts but not necessarily to denote the same or different materials.

Furthermore, any reference to singular includes plural embodiments, and any reference to more than one component or step may include a singular embodiment or step. Surface shading lines may be used throughout the figures to denote different parts but not necessarily to denote the same or different materials.

Figure 1A:
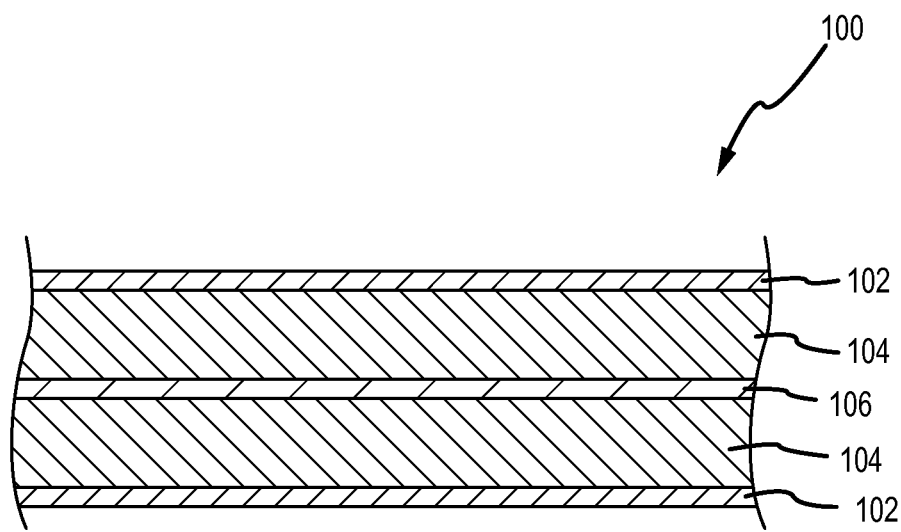
FIG. 1A illustrates a multi-layered acoustic absorption material for use in aircraft compartments, in accordance with various embodiments.

FIG. 1A illustrates a multi-layered acoustic insulation for use in aircraft compartments, in accordance with various embodiments. Acoustic absorption material 100 may include an outer layer 102. Outer layer 102 may be a silicone-coated glass cloth or any other fabric resistant to high temperatures and chemicals. Outer layer 102 may be temperature rated from −65° F. (−53° C.) to 220° F. (104° C.) continuously with a maximum of 550° F. (288° C.) for short periods of time without physical deformation or degradation. Outer layer 102 may also be resistant to chemicals such as jet fuel, oils, and de-icing fluid without physical deformation or degradation. The fabric of outer layer 102 may be rated for an ambient temperature up to 500° F. (260° C.) while maintaining low temperature flexibility at temperatures down to −65° F. Outer layer 102 may have high abrasion resistance and be water, fungi, and chemical resistant.

In various embodiments, acoustic absorption material 100 may include an acoustic absorption batting material 104 proximate to outer layer 102. Acoustic absorption batting material 104 may be a material with chemical and thermal resistance properties such as a flame-resistant, aramid fiber (e.g., Nomex®). Acoustic absorption batting material 104 may be a felt material having a thickness of a quarter-inch (6.4 mm) to an inch (25.4 mm) or greater (e.g., half-inch thick Nomex® felt). Acoustic absorption batting material 104 may be affixed to outer layer 102 using adhesives, chemical and temperature resistant thread, rivets, screws, or other fasteners. Acoustic absorption batting material 104 may be stitched into outer layer 102 using a chemical and heat resistant thread, for example a para-aramid thread (e.g. Kevlar® thread). Acoustic absorption batting material 104 may have the chemical and heat resistant thread stitched around acoustic absorption batting material 104 to hold acoustic absorption batting material 104 floating in a fixed location between outer layers 102. Acoustic absorption batting material 104 may also be stitched directly to outer layer 102 with the chemical and heat resistant thread passing through acoustic absorption batting material 104 to fix acoustic absorption batting material 104 to outer layer 102.

In various embodiments, acoustic absorption material 100 may include a high-temperature, room temperature vulcanizing silicone rubber (RTV) 106. RTV 106 may retain its elastomeric properties from −65° F. (−53° C.) to 500° F. (260° C.) continuously and up to 600° F. (316° C.) for short periods of time. RTV 106 may be coated with, or replaced by, a fluorosilicone material. Acoustic absorption batting material 104 may also be dipped in RTV 106 and set in place over a surface so that acoustic absorption batting material 104 and RTV 106 are molded to a contour of the surface. RTV 106 may be stitched in place proximate to acoustic absorption batting material 104 using chemical and heat resistant thread. Outer layer 102, acoustic absorption batting material 104, and RTV 106 may be in varying orders and varying thicknesses. The thickness of RTV 106 may be varied to adjust the weight of acoustic absorption material 100.

In various embodiments, acoustic absorption batting material 104 may absorb a portion of the acoustic energy directed towards acoustic absorption material 100. RTV 106 acts as a barrier off which noise will reflect and allow the acoustic absorption material to absorb more acoustic energy. The RTV layers may also absorb acoustic energy with thicker RTV layers tending to being more effective absorbers of acoustic energy. Acoustic absorption material 100 may provide acoustic damping in thermally and chemically demanding applications.

Figure 1B:
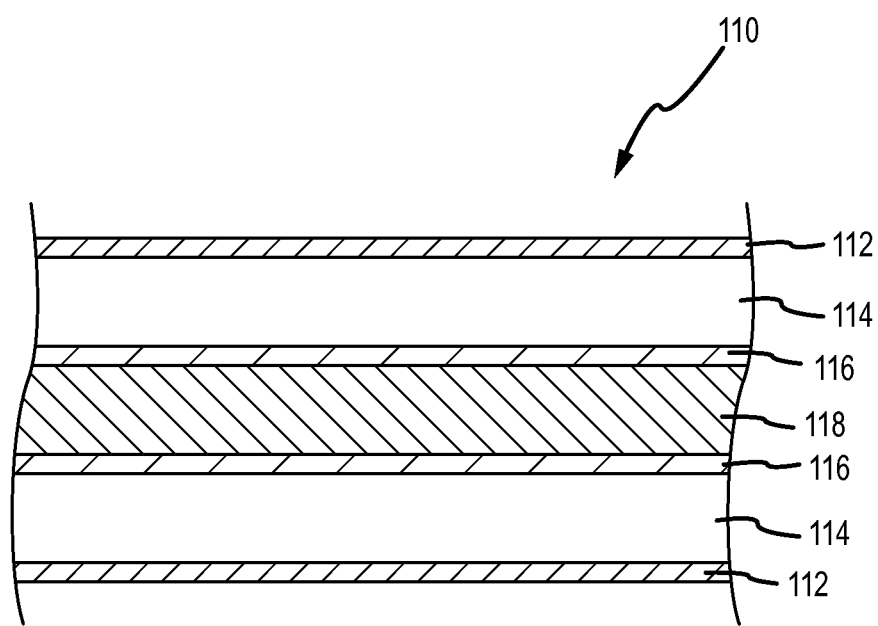
FIG. 1B illustrates a multi-layered acoustic absorption material for use in aircraft compartments, in accordance with various embodiments.

FIG. 1B illustrates a multi-layered acoustic insulation for use in aircraft compartments, in accordance with various embodiments. Acoustic absorption material 110 may include an outer layer 112 similar to outer layer 102. Acoustic absorption material 110 may further include an acoustic absorption batting material 118 similar to acoustic absorption batting material 104. Acoustic absorption material 110 may also include RTV 116 similar to RTV 106.

In various embodiments, acoustic absorption material 110 may include a thin fibrous layer 114 (e.g., fiber glass) with outer layer 102 comprising a thin silicone layer over thin fibrous layer 114. Thin fibrous layer 114 may be affixed to outer layer 112 via adhesives, chemical and temperature resistant thread, rivets, screws, or other fasteners.

Figure 1C:
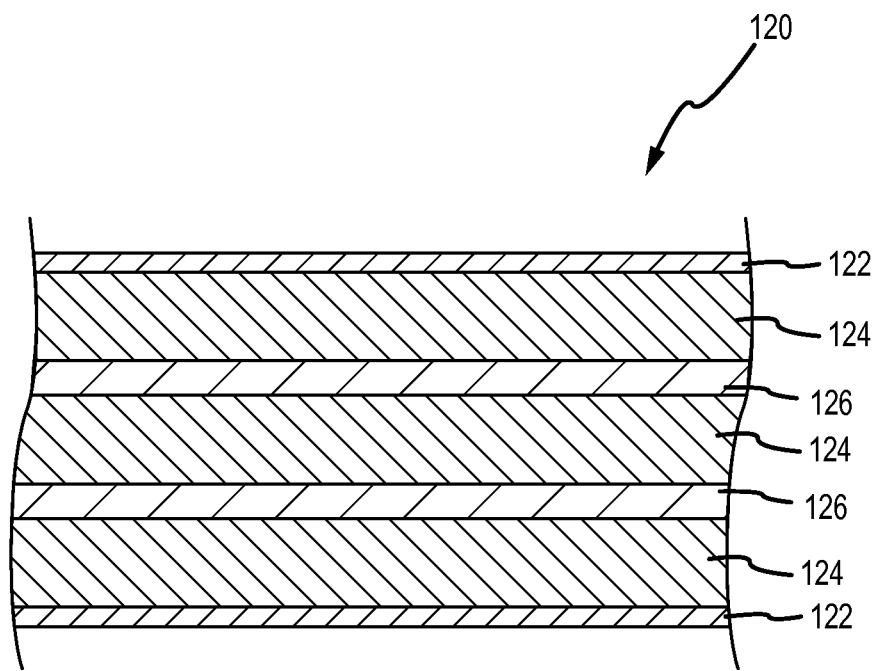
FIG. 1C illustrates a multi-layered acoustic absorption material for use in aircraft compartments, in accordance with various embodiments.

FIG. 1C illustrates a multi-layered acoustic absorption material for use in aircraft compartments, in accordance with various embodiments. Acoustic absorption material 120 may include an outer layer 122 similar to outer layer 102. Acoustic absorption material 120 may further include an acoustic absorption batting material 124 similar to acoustic absorption batting material 104. More than one layer of acoustic absorption batting material 124 may be alternated with RTV 126. RTV 126 of acoustic absorption material 120 may be similar to RTV 106.

Figure 2:
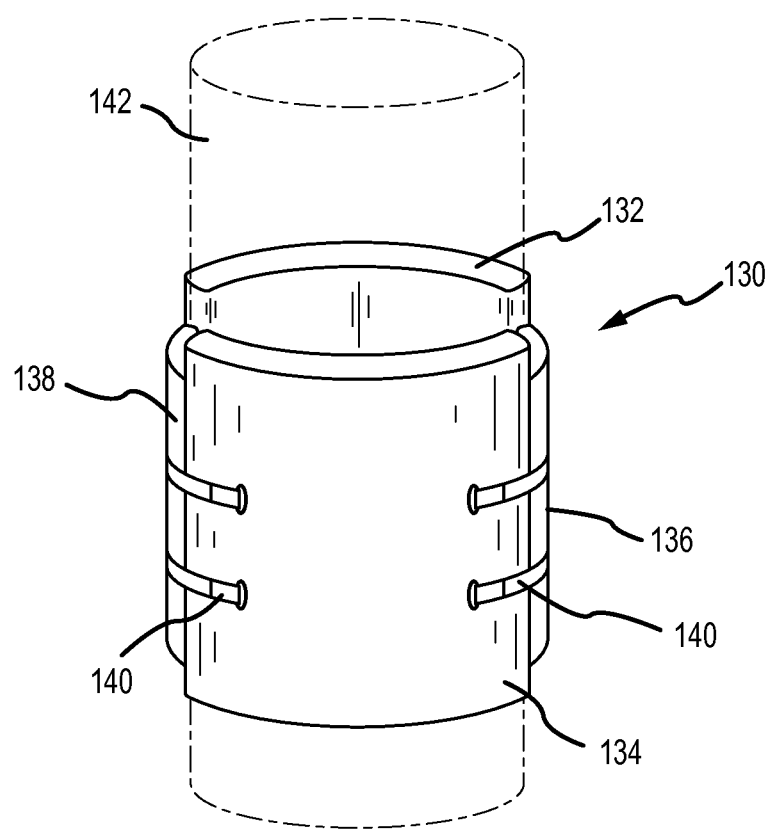
FIG. 2 illustrates a perspective view of an acoustic blanket comprising multi-layered acoustic insulation configured for use over a cylindrical pump, in accordance with various embodiments.

FIG. 2 illustrates a perspective view of a blanket comprising multi-layered acoustic absorption material configured for use over a cylindrical pump, in accordance with various embodiments. Acoustic blanket 130 may be constructed of an acoustic absorption batting material, silicone layers, and silicone coated cloth, for example, acoustic absorption materials 100, 110, and 120 and arranged as described above with momentary reference to FIGS. 1A-1C. Acoustic blanket 130 may be stitched together with Kevlar thread.

In various embodiments, acoustic blanket 130 may include a rear pad 132 and a front pad 134 with side pads 136 and 138 extending between front pad 134 and rear pad 132. Front pad 134 and rear pad 132 may have a height greater than side pads 136 and 138. Front pad 134 and rear pad 132 may approximate the height of the component the pads are covering. For example, the front pad and rear pad may have a height between 9 inches and 10 inches to cover a 9-inch-tall pump. Side pads 136 and 138 may be shorter to accommodate clearance of other parts. Straps 140 may attach acoustic blanket 130 to pump 142 or any other component requiring noise damping.

In various embodiments, acoustic blanket 130 may be designed in shape, thickness or other aspects to be compliant with aircraft conditions, including aircraft fluid resistance and thermal extremes. Acoustic blanket 130 may also be designed to fit snug to the component being abated to optimize acoustic absorption. The attachment of acoustic blanket 130 may be intended to be both installable and removable without having to remove surrounding components. Acoustic blanket 130 may be a stack up of acoustic absorption and dispersion materials. The core of the stack up is silicone or RTV (E.G., RTV 106 from FIG. 1A), which is designed to disperse and absorb the bulk of airborne emissions. On either side of the silicone, there is a layer of acoustic absorption batting material (e.g., acoustic absorption batting material 104 from FIG. 1A) designed to absorb scattered or dispersed airborne emissions that are not absorbed by the silicone. Acoustic blanket 130 may include an outer layer on each side comprising silicone-coated fiberglass or silicone-coated cloth that protects the stack up from fluid and particulate contamination. The silicone in the outer layer may provide an additional (although minor relative to other layers) absorption capability.

In various embodiments, quarter-inch-thick (6.4 mm) silicone may be cast and cut to size to fit acoustic blanket 130. On either side of the silicone core, a layer of acoustic absorption batting material (e.g., acoustic absorption batting material 104 from FIG. 1A) may be affixed. The acoustic absorption batting material may have excellent thermal and chemical resistance properties. The acoustic absorption batting material may be a felt made from a flame-resistant, aramid fiber. The felt may be selected due to its acoustic absorptive properties. The batting layer may be quarter-inch thick felt (6.4 mm), for example.

In various embodiments, the silicone layer may provide significant acoustic absorption capability, depending on the thickness of the silicone layer and the angle of incidence. For example, in a pump application, acoustic blanket 130 may be fabricated with a quarter-inch thick (6.4 mm) silicone layer will be attached around the reservoir, a reduction between 10 to 31 dB is possible at a frequency of 500 Hz and 16 to 37 dB at a frequency of 1000 Hz.

In various embodiments, the fabric or outer layer of acoustic blanket 130 may be joined together using a para-aramid synthetic fiber (e.g., Kevlar®) thread. The thread may be sewn around the edges of acoustic blanket 130 and anywhere that access slots/flaps are required in acoustic blanket 130. The thread may be used in high temperature applications and is chemical and fungus resistant. The blanket materials consisting of the absorption batting and the inner silicone core are then inserted into the joined case. The thread seam exposed to the blanket exterior may be treated with a seal coating of high temperature RTV that bonds well to a variety of surfaces without the need for primers. The RTV seal coat may provide a barrier preventing moisture, de-icing fluids, and fuel from entering the acoustic blanket at the thread seam holes.

Acoustic blanket 130 may be installed in the wheel well of an aircraft. Acoustic blanket 130 may be attached, for example, to an integrated cooling system pump to abate pump noise. Silicone in acoustic blanket 130 is generally solvent resistant. A fluorosilicone material may be substituted for RTV, or simply used to coat the base silicone material.

In various embodiments, acoustic blanket 130 may be attached to the pump using straps 140, which may comprise hook and loop fasteners (e.g., Velcro®) in conjunction with metal loops. Straps 140 may be sewn onto the fabric of the outer layer using the Kevlar thread and may be one inch (25.4 mm) thick. Various attachment designs may be implemented, including a metal band clamp with belt loops made from the silicone fabric material used in acoustic blanket 130, metal bands around acoustic blanket 130, clamps, molding, or other suitable means of attachment.

Figure 3:
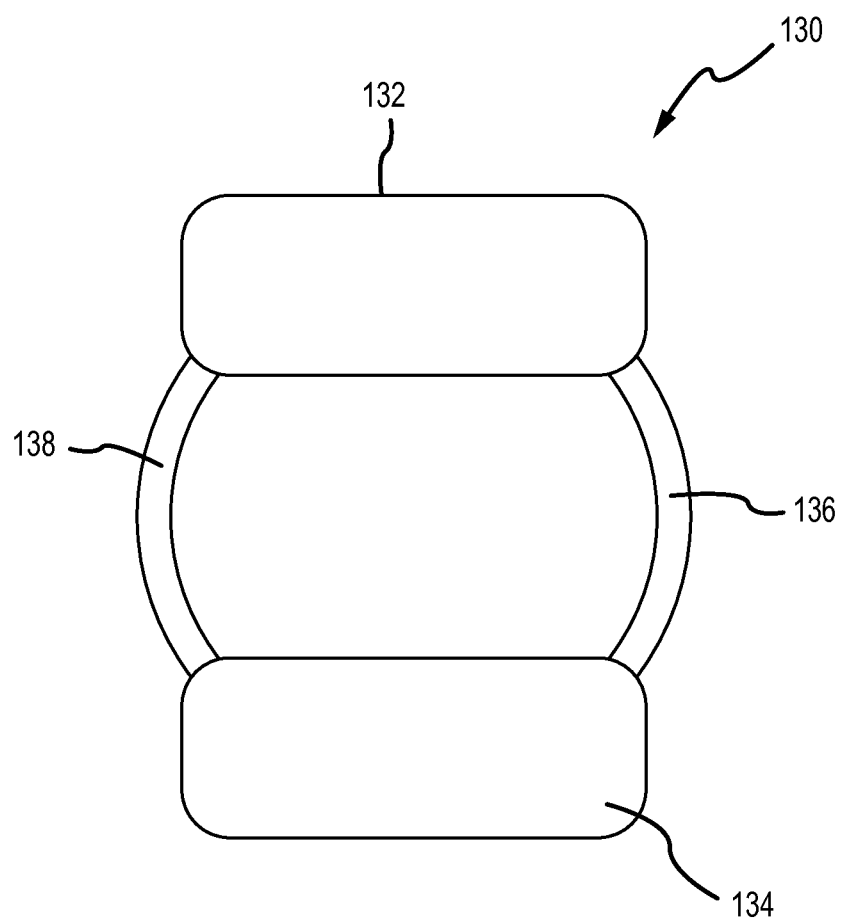
FIG. 3 illustrates a top view of an acoustic blanket comprising multi-layered acoustic insulation configured for use over a cylindrical pump, in accordance with various embodiments.

FIG. 3 illustrates a top view of a blanket comprising multi-layered acoustic insulation configured for use over a cylindrical pump, in accordance with various embodiments. Acoustic blanket 130 may have a circular shape when viewed from above. Front pad 134 and rear pad 132 have greater thickness than side pads 136 and 138. Front pad 134 and rear pad 132 may comprise a thicker noise absorption (e.g., acoustic absorption material 110 or 120 from FIGS. 1B and 1C) material including more layers or thicker layers than side pads 136 and 138. Side pads 136 and 138 may comprise a thinner material with fewer layers (e.g., acoustic absorption material 100 from FIG. 1A).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An acoustic absorption material, comprising:
    an outer layer comprising a silicone-coated glass cloth;
    a first layer of batting material proximate to and contacting the outer layer; and
    a first layer of room temperature vulcanized silicone (RTV) proximate to and contacting the first layer of batting material, wherein the outer layer, the first layer of batting material, and the first layer of RTV form an acoustic blanket having a circular shape and configured for attachment to a pump.

2. The acoustic absorption material of claim 1, further including a second layer of batting material proximate to the first layer of RTV and opposite the first layer of batting material with the first layer of RTV disposed between the first layer of batting material and the second layer of batting material.

3. The acoustic absorption material of claim 2, further including:
    a second layer of RTV proximate to the second layer of batting material and opposite the first layer of RTV; and
    a third layer of batting material proximate to the second layer of RTV and opposite the second layer of batting material.

4. The acoustic absorption material of claim 1, further including:
    a fibrous glass layer proximate the first layer of RTV and opposite the first layer of batting material; and
    a silicone layer proximate to the fibrous glass layer and opposite the first layer of RTV.

5. The acoustic absorption material of claim 1, wherein the first layer of batting material comprises an aramid fiber.

6. The acoustic absorption material of claim 1, wherein the first layer of batting material is coated in RTV.

7. An acoustic blanket, comprising:
    a pad, comprising:

an outer layer,
a first layer of batting material proximate to the outer layer, and
a first layer of silicone proximate to the first layer of batting material;
a side pad coupled to the pad, wherein the pad comprises a greater thickness than the side pad, and wherein the pad comprises a greater height than the side pad;
a strap around the pad and the side pad and configured to attach the acoustic blanket to a pump.

8. The acoustic blanket of claim 7, wherein the pad further comprises a second layer of batting material proximate to the first layer of silicone and opposite the first layer of batting material.

9. The acoustic blanket of claim 8, wherein the pad further comprises:

a second layer of silicone proximate to the second layer of batting material and opposite the first layer of silicone; and
a third layer of batting material proximate to the second layer of silicone and opposite the second layer of batting material.

10. The acoustic blanket of claim 7, wherein the first layer of silicone comprises a room temperature vulcanized silicone rubber (RTV).

11. The acoustic blanket of claim 7, wherein the strap comprises a hook and loop fastener.

12. The acoustic blanket of claim 7, wherein the first layer of batting material comprises an aramid fiber.

13. The acoustic blanket of claim 7, wherein the outer layer comprises a silicone-coated glass cloth.

14. The acoustic blanket of claim 7, wherein the first layer of batting material is coated in RTV.

* * * * *